United States Patent [19]

Meyer

[11] Patent Number: 5,269,829
[45] Date of Patent: Dec. 14, 1993

[54] METHOD FOR ACCELERATED AEROBIC DECOMPOSITION OF VEGETATIVE ORGANIC WASTE MATERIAL

[75] Inventor: Donald W. Meyer, Ixonia, Wis.

[73] Assignee: Compost Technologies, Inc., Watertown, Wis.

[21] Appl. No.: 969,509

[22] Filed: Oct. 30, 1992

Related U.S. Application Data

[63] Continuation of Ser. No. 738,958, Aug. 1, 1991, abandoned.

[51] Int. Cl.$^5$ .................... C05F 17/00; C05F 5/00; C05F 9/00; C05F 9/04
[52] U.S. Cl. .............................................. 71/9; 71/23
[58] Field of Search ................................................ 71/23

[56] References Cited

U.S. PATENT DOCUMENTS

| | | | |
|---|---|---|---|
| 2,867,521 | 1/1959 | Jeffreys | 71/9 X |
| 2,969,279 | 1/1961 | Pierson | 71/9 |
| 3,138,447 | 6/1964 | Eweson | 71/9 |
| 3,276,845 | 10/1966 | Redman | 23/259.3 |
| 3,756,784 | 9/1973 | Pittwood | 23/259.1 |
| 3,930,799 | 1/1976 | Eweson | 23/259.1 |
| 3,934,999 | 1/1976 | Meier | 71/9 |
| 4,100,023 | 7/1978 | McDonald | 71/9 X |
| 4,230,676 | 10/1980 | Tayler et al. | 422/62 |
| 4,255,389 | 3/1981 | Jung et al. | 422/209 |
| 4,302,546 | 11/1981 | Schlichting, Jr. | 435/315 |
| 4,326,874 | 3/1982 | Burklin | 71/9 |
| 4,436,817 | 3/1984 | Nemetz | 435/313 |
| 4,666,854 | 5/1987 | Sugiura | 435/313 |
| 4,687,645 | 8/1987 | Harvey | 422/184 |

OTHER PUBLICATIONS

"Solar Forced-Air Compressor" by Prof. John J. Poluhowich, A. Scott Whyte & Norman Adelkopt; Tropical Research—Mar., 1986.

Primary Examiner—Ferris Lander
Attorney, Agent, or Firm—Reinhart, Boerner, Van Deuren, Norris & Rieselbach

[57] ABSTRACT

A method for aerobic decomposition of vegetative organic waste material including high flow-rate aeration, compaction of the organic material, and continual percolation of moisture released therefrom in a collapsible, portable, bag container to provide beneficial soil amendments, fertilizers, and supplemental heat sources.

14 Claims, 2 Drawing Sheets

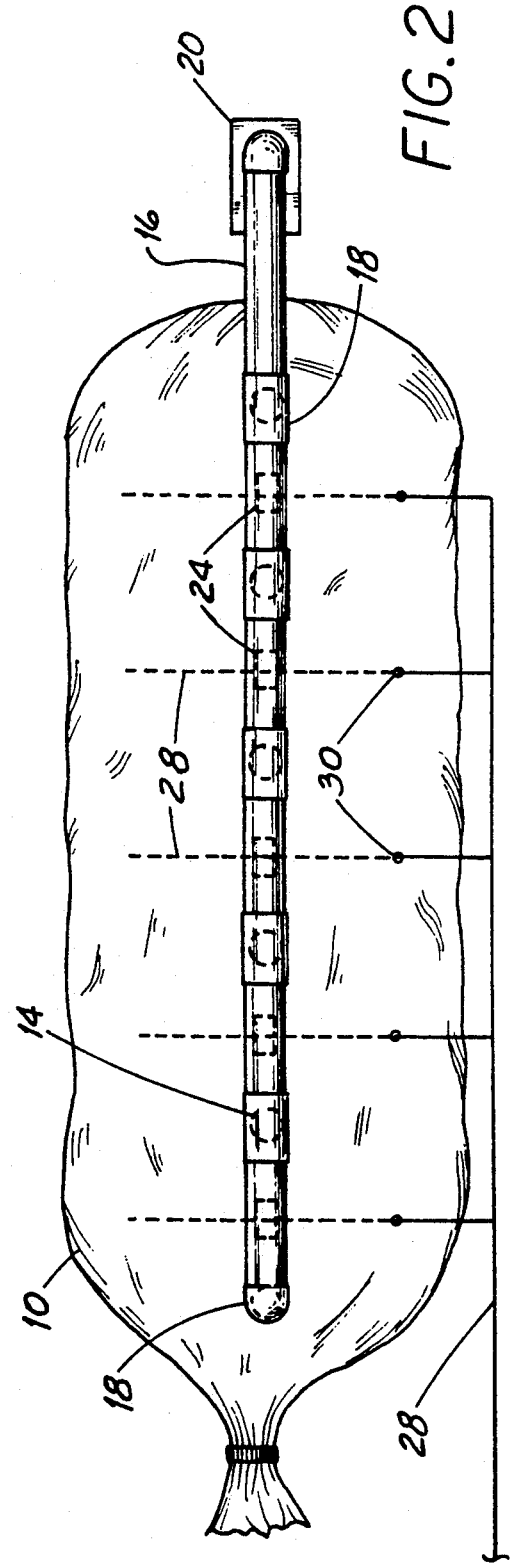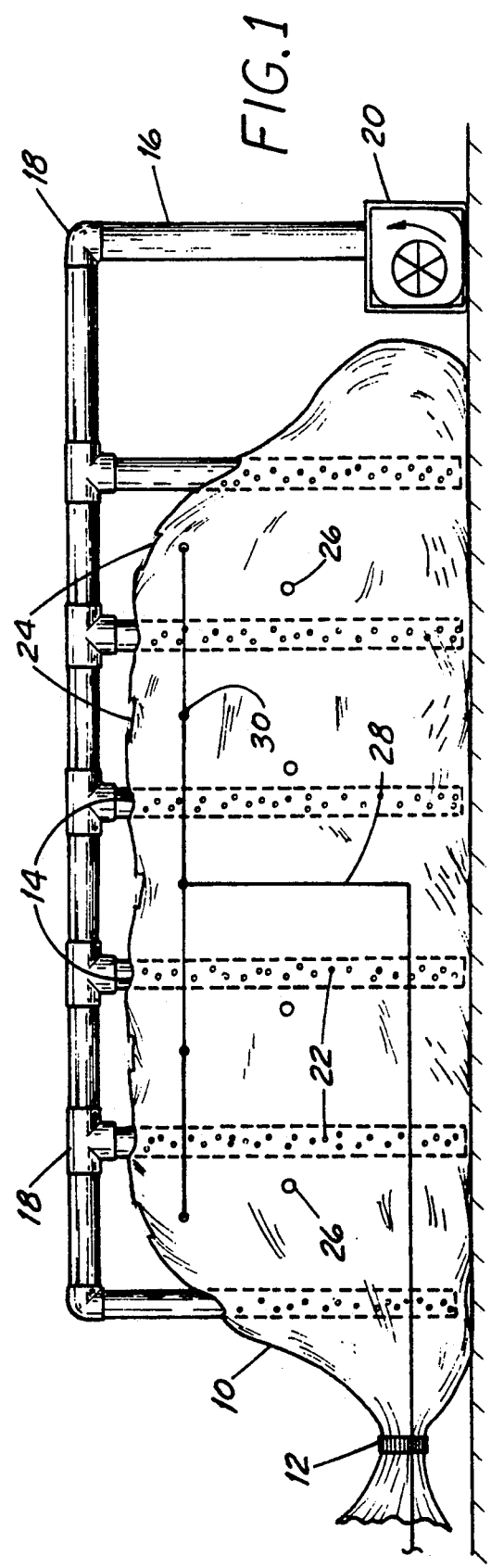

METHOD FOR ACCELERATED AEROBIC DECOMPOSITION OF VEGETATIVE ORGANIC WASTE MATERIAL

RELATED APPLICATION

This application is a continuation of copending U.S. patent application Ser. No. 07/738,958, filed on Aug. 1, 1991 and now abandoned.

FIELD OF THE INVENTION

This invention is related generally to the aerobic decomposition of vegetative organic waste material and, more particularly, to a method and apparatus used therewith to greatly accelerate such decomposition.

BACKGROUND OF THE INVENTION

The past several years have been witness to a renewed interest in the environment. The special attention afforded so-called "green" products and methods of production attest to the fact that commercial viability is not always contrary to resource conservation. Often, environmental regulations and/or restrictions provide the impetus for innovative methods and apparatus.

A case in point is the recent legislative trend toward banning landfill disposal of various waste materials. Of course, many hazardous chemical and biological wastes have long been restricted, but with available landfill space becoming increasingly scarce, common yard and various related forms of vegetative organic wastes will soon require alternate means of disposal. Municipalities and other levels of government are faced with an urgent and growing problem.

The advantages of composting or decomposing organic material to provide various fertilizers and/or soil amendments are well-known. The challenge has always been one of adapting backyard garden techniques to processes capable of handling large volumes, such as those typically generated by municipalities, in a safe, environmentally-conscious manner. The problem has been compounded in recent years by the budgetary constraints under which most governmental units operate. Economy and fiscal responsibility are, thus, additional on-going concerns in the art.

The prior art includes a variety of attempts to produce an apparatus or derive a method to decompose or compost waste organic material through the metabolic activity of aerobic bacteria. Most provide only limited success. U.S. Pat. No. 3,934,999 describes use of an aqueous bacterial inoculant and depends on absorption of solar heat to decompose a small amount of dry organic material placed in a common home garbage bag. A number of evenly spaced apertures in the bag allow passive movement of air and facilitate composting. Periodic, manual agitation of material is required and possible only because the method is restricted to exceedingly small volumes.

U.S. Pat. No. 3,756,784 is directed to a complex apparatus for the sequential composting of domestic refuse and includes a plurality of essentially immovable vertically-disposed chambers, each with its own agitator, water supply, and air supply. The rates of addition of air and water are a function of temperature and carbon dioxide levels in each chamber. A varying combination of air, water, and agitation must be accurately administered to maintain aerobic conditions in each chamber.

U.S. Pat. No. 4,302,546 discloses a constantly rotating tank-like apparatus to recycle animal wastes. Carbonaceous filler materials must be added to control moisture content. Continual, low flow-rate aeration facilitates decomposition. Exhaust air is past through a scrubber to eliminate foul-smelling components which would otherwise pollute the surrounding atmosphere.

U.S. Pat. Nos. 3,138,447 and 3,930,799 are directed to a process and apparatus, respectively, for producing fertilizer from organic and inorganic municipal garbage. Low flow-rate aeration is aided by constant "tumbling" to prevent air channel formation. Moisture is first introduced to enhance decomposition via the addition of sewerage sludge then removed during a later drying phase. Temperature and carbon dioxide levels are monitored throughout decomposition.

U.S. Pat. No. 4,230,676 describes an apparatus and method for decomposition using exposed windrows of organic material. Integral to both the apparatus and method is a microprocessor which monitors temperature, air/moisture content, and pH of the windrowed material. A complex, adjustable injector configuration makes any additions/corrections necessary in response thereto.

Various prior art sources teach the use of a Beltsville or modified Beltsville system, which is necessarily limited to composting small volumes of material under tropic or warm weather conditions through use of a solar forced-air collector. Low-rate aeration and initial addition of water to loosely-arranged material characterize methods of this type. The apparatus used therewith typically includes overlapping sheets of plastic to catch rain water.

These are but a few examples of the prior art. Other methods and/or apparatus may be characterized as involving extensive waste analysis and monitoring, supplemental heat supplies, and agitation, among other steps or components. As is evident, a considerable number of drawbacks and problems exist in the prior art relating to the beneficial decomposition of organic waste materials.

There is a need for an improved aerobic decomposition method to more fully utilize the advantages associated with re-using waste materials of the sort and, at the same time, provide for a feasible, environmentally-safe alternative to landfill disposal.

OBJECTS OF THE INVENTION

It is an object of this invention to provide a method of accelerated decomposition of vegetative organic waste material, overcoming some of the problems and shortcomings of the prior art, including those mentioned above.

Another object of this invention is to provide a method for quick, efficient decomposition of large volumes of vegetative organic material as a useful alternative for landfill disposal.

Another object of this invention is to provide a method of decomposition which may be used with large volumes of organic material in conjunction with a lightweight, portable apparatus.

Another object of this invention is to provide a method of decomposition which does not require the use of a complex, expensive apparatus comprising numerous constantly-moving components prone to costly repair and maintenance.

Another object of this invention is to provide a method of decomposition such that the desired degree of bacterial degradation may be achieved without resort to complex and/or computerized analytic techniques.

Another object of this invention is to provide an odor-free method of decomposition without use of pollution-control or abatement devices.

Another object of this invention is to provide a method of decomposition which does not necessitate either a chemical or bacterial inoculant or an extraneous heat source such as solar radiation.

Another object of this invention is to provide a method of decomposition which does require the use of either dry, absorptive filler materials or sewage sludge to obtain suitable moisture levels.

These and other important objects will be apparent from the descriptions of this invention which follow.

SUMMARY OF THE INVENTION

This invention is a method for accelerated decomposition of large volumes of vegetative organic waste material. It overcomes certain well-known problems and deficiencies, including those outlined above. An important aspect of this invention is a novel combination of constant high-flow rate aeration, material compaction, and continual moisture percolation, all of which are used in conjunction with a unique container apparatus to provide not only a viable alternative to landfill disposal, but means to produce useful soil amendments, fertilizers, and a source of supplemental heat. The inventive method allows for quick, cost-effective aerobic decomposition, such that the advantages associated with recycling materials of this sort may be more fully realized.

This invention is a method of aerobically decomposing large volumes of vegetative organic material including (1) providing a substantially collapsible or portable container having at least one open end, vent means, and an upper portion with a plurality of openings, said container connected at said openings to means for variable high-rate air intake; (2) packing the container with vegetative organic material having a moisture content; (3) closing the open end of the container such that it is substantially moisture-retentive; (4) aerating the container continuously through the openings at a rate of about 200-1500 cubic feet per minute; and (5) percolating moisture throughout the organic material.

In preferred embodiments of this invention, the container is a flexible, substantially moisture-impermeable bag; and the air-intake means is a discharge blower connected to a series of conduits such that the conduits are inserted through the container openings and extend substantially to the bottom of the bag. In highly preferred embodiments, the conduits are perforated in those portions extending into the bag.

In preferred embodiments of this invention, the organic material is aerated at a rate of about 400-1100 cubic feet per minute and a static pressure of at least 0.5 inches of water. In highly preferred embodiments, the organic material is aerated at a rate of about 600 cubic feet per minute and a static pressure of about 0.5-1.5 inches of water.

The organic material decomposed through the method of this invention preferably includes a bulking agent in about 10-75% by weight of the organic material. In highly preferred embodiments, the weight of the bulking agent is about 25-50% of the total weight of the organic material.

In preferred embodiments of this invention, the organic material is packed into the bag with a pressure of about 0.1-10.0 pounds per square inch. In preferred embodiments, the packing pressure is about 0.5-5.0 pounds per square inch, such that the packed material has a density of about 10-75 pounds per cubic foot. In highly preferred embodiments, the packed material has a density of about 25-35 pounds per cubic foot such that it retains heat generated during composition yet allows movement of moisture of air therethrough.

As a final step, this method includes percolation whereby moisture content is released from the organic material during composition, then vaporized by heat generated and condensed on the container.

The method of this invention also contemplates monitoring the internal temperature of the organic material to determine the aeration rate required for optimal decomposition. Likewise, the method may also include injecting water into the organic material to achieve optimal decomposition.

As previously noted, the method of decomposition as revealed through this invention, has certain advantages, most of which relate directly to the ease and rate at which a useful degree of decomposition may be achieved. Natural composting requires up to two years under typical conditions. This inventive method permits large-scale decomposition in a fraction of that time, such that volumes approximating 1,000 cubic yards of waste may be sufficiently decomposed within four months or less with a concomitant volume reduction of nearly 80%.

Conservative estimates indicate a typical city of 750,000 may produce, won an average annual basis, 45,000 tons of yard and related waste—waste which would otherwise be landfilled. When considered with the fact useful by-products and a supplemental heat source may be derived from what would otherwise be a costly refuse problem, the benefits available through use of this method to municipal governments, as well as others similarily-situated, are immediately evident.

As detailed more fully below, aerobic bacterial decomposition is a very exothermic process. Temperatures exceeding 130° F. are typically generated. As such, the high flow-rate aeration component of this inventive method may be used to provide a supplemental heat source for a variety of functions, including the winter-heating of a greenhouse or similar such structure in which case the organic material decomposed is that produced during the growing season.

Regardless, the material remaining upon completion of decomposition is a useful soil amendment and fertilizer for residential or agricultural use in that it provides excellent aeration and water-retention qualities and nutrients to any soil to which it is introduced. It may also be used in conjunction with various road and highway projects to prevent surface erosion.

Unlike methods of the prior art, that revealed herein may be employed without an expensive and complex apparatus. The preferred bag container used in conjunction with this method is relatively inexpensive. It may be used to decompose large volumes of organic waste material, yet may be purchased at a fraction of the cost of conventional equipment. Costly repair and downtime associated with apparatus of the prior art are avoided by an absence of components moving against the weight of a large volume of waste material. Furthermore, it is light-weight and portable such that it may be relocated once decomposition is complete.

As significant as these attributes are, perhaps the most important benefits derived from use of the bag apparatus of this invention are those more directly related to the environment. The preferred bag container eliminates wind-borne debris and prevents potentially-hazardous decomposition leachates from running into and contaminating surface water. Together with odorless decomposition, these advantages make use of this method ideal for municipalities composting near residential areas.

The preferred discharge blower component effects high flow-rate aeration and is a useful compliment to the preferred bag container. Light weight and simplicity of design promote easy assembly and allow both the blower and conduits to be moved with the preferred bag when or as needed.

Low cost and maintenance are important advantages associated with use of the preferred apparatus of this invention. Likewise, the water injector and temperature monitoring means which may be used with the method of this invention are also effective without significantly increasing the cost of decomposition, an important consideration to municipalities and others restrained by budget limitations.

Aerobic decomposition is predominantly a function of the internal temperature of the waste material and aerobic bacteria indigenous to it, and proceeds effectively at a temperature of about 130°-160° F. As a rule, when the temperature drops below this range bacterial activity declines; excessive heat promotes anaerobic decomposition. An inventive aspect of this method includes control of decomposition through rate of aeration. It has been established that changes in aeration rates may be used to effect almost-immediate response in mass temperature. As a result, the internal temperature of the decomposing material be adjusted to within 5° F. of the desired temperature condition without resorting to expensive, complex microprocessors or other analytic methods of the prior art.

The need for complete aerobic decomposition is immediately obvious once the internal temperature of the organic mass exceeds the desired range for any length of time. The gaseous by-products of anaerobic decomposition tend to be foul-smelling and are widely-considered a form of pollution completely unacceptable to those unfortunate to reside in close proximity. The method of this invention prevents anaerobic bacterial activity such that decomposition proceeds effectively without offensive odors or the need for auxiliary scrubbing or control devices.

As inferred above, bacteria indigenous to the waste material may be utilized without adding extraneous decomposition-enhancing chemicals or bacterial cultures. Inasmuch as inoculants of this sort are relatively expensive and require additional monitoring, a considerable cost-savings compared to methods of the prior art may be realized.

This inventive method anticipates the possibility that the addition of moisture may be required to enhance the rate of decomposition with certain extremely dry waste materials. However, with most organic wastes, the natural moisture content has been found sufficient, foregoing the need to add sewerage sludges or other high-water-content materials which may have a corrosive, deleterious effect on any apparatus used. Conversely, too much water does not impede this method. Because excessive moisture only enhances percolation and decomposition, filler materials of the prior art are not needed to absorb water.

The method of this invention would not seem appropriate for the aerobic decomposition of organic material. Aeration systems of the prior art stress the use of low flow-rates in combination with loosely-arranged waste material either constantly or periodically agitated to encourage aerobic conditions. The use of high flow-rate aeration with compacted material and continual percolation of moisture is contrary to the art, and the excellent results obtained were quite unexpected.

BRIEF DESCRIPTION OF THE DRAWINGS

A preferred embodiment of an apparatus suitable for employing the method of this invention is shown in the accompanying drawings, of which:

FIG. 1 is a sectional view of the apparatus;
FIG. 2 is a top view of the apparatus.

DETAILED DESCRIPTIONS OF THE PREFERRED EMBODIMENTS

Figure 3:
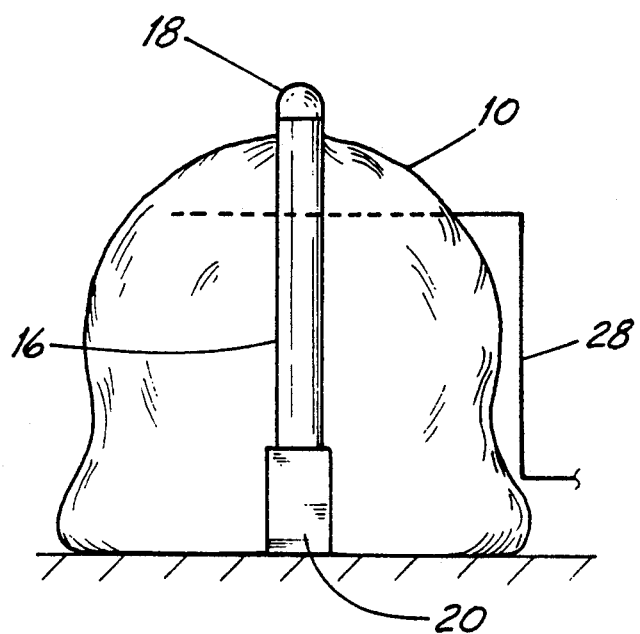
FIG. 3 is a side view of the apparatus.

The drawings illustrate the preferred embodiment of an apparatus which may be used to employ the method of this invention. The apparatus includes bag 10 and air conduit 16 attached to blower 20.

As best shown in FIG. 1, bag 10 is provided with a plurality of substantially evenly-spaced openings 14 through which air conduits 16 are inserted. Joints 18 allow conduits 16 to be used in a series configuration. Once bag 10 is sufficiently packed with organic waste material, fastener means 12 secures the open end, creating a substantially moisture-retentive container.

Air conduits 16 are connected to discharge blower 20 which, when in operation, provides high flow-rate aeration throughout bag 10. Conduits 16 extend substantially the depth of bag 10. Perforations 22 spaced along conduits 16 allow air forced therethrough to permeate the vegetative matter. Homeostatic air flow is achieved through incorporation of exhaust vents 24, preferably located in the upper portion of bag 10 between conduits 16. Temperature monitoring means may also be used in conjunction with the method of this invention. In such case, apertures 26, as shown in FIG. 1, are made through bag 10 for insertion of such means into the material mass.

As best shown in FIGS. 2 and 3, water injection means 28 may be employed with the method of this invention. If so, such means may be inserted through holes 30 into an upper portion of bag 10 and the vegetative matter contained therein. Preferably, injection means 28 is in a series configuration such that it is aligned between and at right angles to conduits 16.

High flow-rate aeration and an apparatus to provide the same are essential to the aerobic decomposition described herein. In accordance with this invention, a container packed with vegetative organic material is aerated continuously at a rate of about 200–1500 cubic feet per minute to obtain optimal aerobic decomposition conditions. At aeration rates below this range, anaerobic bacteria and odiferous metabolic by-products predominate; aeration in excess of this rate appears to create conditions disruptive to aerobic bacterial activity.

In preferred embodiments of this invention, air is forced through a container apparatus at a rate of about 400–1100 cubic feet per minute. In highly preferred embodiments, accelerated decomposition may be achieved with a flow rate of about 600 cubic feet per minute. Air flow must be conducted at a sufficient static pressure to achieve the desired aerobic decomposition.

Pressures of at least 0.5 inches of water are needed to force the preferred volumes of air through the air conduits. Studies show that pressures of 0.5–1.5 inches of water provide excellent results.

Bulking agents such as straw, wood chips, and the like may be used with the method of this invention. Inclusion of these materials promote aeration and enhance aerobic decomposition by creating air spaces and passages within the vegetative mass. As a result, optimal aerobic temperatures may be obtained more readily and adjusted by air-flow rates more efficiently.

As stated above, a bulking agent may comprise about 10–70 percent by weight of the vegetative organic material to be decomposed. The exact amount utilized depends, in large part, on the compaction susceptibility of the vegetative material which, in turn, depends upon its moisture content. It has been found with most waste materials the bulking agent should be about 25–50 percent of the total weight of the organic material. The exact amount used may vary with the air flow-rate utilized.

It is essential that the organic material be compacted into the container apparatus to retain heat generated during decomposition and further enhance aerobic bacterial activity. Unlike methods of the prior art, most of which include means to prevent compaction, a preferred method of this invention entails filling a container with moderate pressure. The pressure utilized varies and depends, in part, on the moisture content of the material to be decomposed.

Typically, pressures of about 0.5–5.0 pounds per square inch are employed during packing process. With materials such as grasses which have a relatively high moisture content, the pressure used will tend toward the lower end of this range; higher pressures will result in a mass density which may preclude sufficient aeration and lead to unwanted anaerobic decomposition. Conversely, materials such as dry leaves are packed with pressures near the upper end of the aforementioned range. In these situations, too little pressure results in a material mass with insufficient heat retention qualities. To some degree, packing pressures may be modified for a given material and moisture content through adjustment of the amount of bulking agent used. Packing may be accomplished through use of apparatus well-known to those made familiar with this invention. Blowers and auger-type devices which supply sufficient, constant pressures of the sort described herein may be successfully.

Constant high flow-rate aeration is accompanied by continual percolation of moisture throughout the material mass. The preferred bag container used in conjunction with this inventive method permits accumulation of moisture as it is released from the decomposing material. As decomposition proceeds, the internal temperature rises and the released moisture vaporizes, passing through the material and condensing on the surface of the bag container. The combination of repeated percolation of moisture and high flow-rate aeration enhances aerobic bacterial activity and accelerates decomposition.

To decompose of especially dry vegetative material, the method of this invention contemplates initial injection of water to approximate a suitable moisture content equivalent to about 20–65% of the weight of the material. Typically, only one such injection is required as the moisture is thereafter continually recycled through the percolation step described above.

Preferred bag 10 may be made using a variety of materials, including polyethylene and other similar durable, flexible plastics. Any material utilized must resist tears when openings are introduced as exhaust vents or for the insertion of aeration conduits, yet must be flexible and extendable enough to accommodate the collection of a significant amount of moisture once decomposition begins. It has been found that a polyethylene bag with a thickness in excess of 6 mil provides excellent results under the decomposition conditions employed with this method. Thinner materials do not provide the strength and flexibility needed to process large volumes of waste material.

Preferred polyethylene bags may range from 10–250 feet in length. For volumes effectively decomposed through use of this method, a 100-foot bag provides excellent results. Such containers are available from sources well known to those skilled in the art and include AG-BAG Corporation of Warrenton, Oreg., among others.

Blower 20 and conduits 16 may also be obtained from a variety of sources well-known to those made aware of this invention. In particular, excellent results will be obtained through use of a blower with means to vary flow-rates such that internal mass temperatures may be adjusted as needed to provide optimal decomposition conditions. One such blower, suitable for employing the method of this invention, is available from Dayton Electric Manufacturing Company of Chicago, Ill.

While the principles of this invention have been described in connection with specific embodiments, it should be understood clearly that these descriptions are made only by way of example and are not intended to limit the scope of the invention. For example, the container apparatus used in conjunction with this method may include various mesh-type materials which permit retention of heat and allow condensation of internal moisture. Likewise, vegetative materials are not necessarily limited to the yard and related waste described. Waste paper, lake algae, and a variety of other vegetative organic materials are suitable for decomposition through the method of this invention.

I claim:

1. A method for aerobically decomposing large volumes of vegetative organic material, comprising:
   providing a substantially collapsible, moisture-retentive, and portable container having at least one open end and an upper portion with a plurality of openings, said container connected at said openings to means for variable high-rate air intake and vent means comprising a plurality of aperatures sufficient in number and dimension to maintain homeostatic airflow and aerobic decomposition temperatures;
   packing the container with vegetative organic material having a releasible moisture content at pressure of about 0.1–10.0 pounds per square inch, whereby the organic material has a density of about 10–75 pounds per cubic foot such that said material is substantially heat retentive, permits movement of moisture therethrough, and maintains homeostatic airflow and aerobic decomposition temperatures;
   closing the open end of the container such that said container is substantially moisture-retentive;
   aerating the container substantially continuously through said openings at a rate of about 200–1500 cubic feet per minute to control and maintain sufficient aerobic decomposition temperatures; and precolating releasible moisture throughout the organic material.

2. The method of claim 1 wherein the container is a substantially moisture-retentive bag.

3. The method of claim 1 wherein the air-intake means comprises a discharge blower and a series of conduits extending therefrom, said conduits inserted through said container openings and extending substantially to the bottom portion of the container.

4. The method of claim 3 wherein the portions of said conduits inserted into the container are perforated.

5. The method of claim 1 wherein the organic material is aerated at a rate of about 400–1100 cubic feet per minute and a static pressure of at least 0.5 inches of water.

6. The method of claim 5 wherein the organic material is aerated at a rate of about 600 cubic feet per minute and a static pressure of about 0.5–1.5 inches of water.

7. The method of claim 1 wherein the organic material includes a bulking agent.

8. The method of claim 7 wherein the bulking agent is about 10–70 percent by weight of the organic material.

9. The method of claim 8 wherein the bulking agent is about 25–50 percent by weight of the organic material.

10. The method of claim 1 wherein the organic material is packed with a pressure of about 0.5–5.0 pounds per square inch.

11. The method of claim 10 wherein the packed organic material has a density of about 25–35 pounds per cubic foot.

12. The method of claim 1 wherein percolation involves release of said moisture content from the organic material during decomposition, vaporization of the same by heat generated thereby, and condensation on the container.

13. The method of claim 1 further comprising monitoring the internal temperature of said organic material to determine the aeration rate required for optimal decomposition.

14. The method of claim 1 further comprising injecting water into said organic material to achieve optimal decomposition.

* * * * *